US010826931B1

(12) United States Patent
Quan et al.

(10) Patent No.: US 10,826,931 B1
(45) Date of Patent: Nov. 3, 2020

(54) SYSTEM AND METHOD FOR PREDICTING AND MITIGATING CYBERSECURITY SYSTEM MISCONFIGURATIONS

(71) Applicant: FireEye, Inc., Milpitas, CA (US)

(72) Inventors: Wei Quan, San Jose, CA (US); Raghunath Konda, Fremont, CA (US)

(73) Assignee: FireEye, Inc., Milpitas, CA (US)

(*) Notice: Subject to any disclaimer, the term of this patent is extended or adjusted under 35 U.S.C. 154(b) by 244 days.

(21) Appl. No.: 15/940,854

(22) Filed: Mar. 29, 2018

(51) Int. Cl.
H04L 29/06 (2006.01)
G06F 21/56 (2013.01)
G06F 17/18 (2006.01)

(52) U.S. Cl.
CPC .......... H04L 63/1441 (2013.01); G06F 17/18 (2013.01); G06F 21/562 (2013.01); G06F 21/566 (2013.01); H04L 63/1433 (2013.01)

(58) Field of Classification Search
CPC ............. H04L 63/1441; H04L 63/145; H04L 63/1433; H04L 63/1416; G06F 17/18; G06F 21/562; G06F 21/564; G06F 21/565; G06F 21/566
See application file for complete search history.

(56) References Cited

U.S. PATENT DOCUMENTS

| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,968,176 A | 10/1999 | Nessett et al. |
| 5,978,917 A | 11/1999 | Chi |
| 5,983,348 A | 11/1999 | Ji |

(Continued)

FOREIGN PATENT DOCUMENTS

| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

Primary Examiner — Hosuk Song
(74) Attorney, Agent, or Firm — Rutan & Tucker, LLP

(57) ABSTRACT

A computerized method for reconfiguring one or more malware detection systems each performing cybersecurity analyses on incoming data is described. The method involves receiving meta-information including metrics associated with a malware detection system. Based on the meta-information, a determination is made whether the malware detection system is operating at an optimal performance level. If not, results produced by conducting behavior analyses predicting operability of the malware detection system are determined and the results are provided as feedback to the malware detection system to update one or more configuration parameter values thereof.

51 Claims, 9 Drawing Sheets

(56) References Cited

U.S. PATENT DOCUMENTS

| | | |
|---|---|---|
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,460,141 B1 | 10/2002 | Olden |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,074,256 B2 | 12/2011 | Valente et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,181,251 B2 * | 5/2012 | Kennedy ............... G06F 21/563 709/201 |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,468,602 B2 * | 6/2013 | McDougal .......... H04L 63/1416 726/22 |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |

(56) References Cited

U.S. PATENT DOCUMENTS

| | | |
|---|---|---|
| 8,516,575 B2 | 8/2013 | Burnside et al. |
| 8,516,583 B2 * | 8/2013 | Thomas ............... G06F 21/562 |
| | | 726/23 |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,404 B2 * | 1/2014 | McDougal ............... G06F 21/56 |
| | | 726/1 |
| 8,627,476 B1 | 1/2014 | Satish et al. |
| 8,635,079 B2 * | 1/2014 | McDougal ............ G06Q 10/06 |
| | | 705/1.1 |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,629 B1 * | 8/2014 | Cherepov ............ G06F 21/554 |
| | | 726/23 |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,486 B1 * | 3/2016 | Chiang ............... H04L 63/14 |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,350,747 B2 * | 5/2016 | McLarnon ............ H04L 63/14 |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,716,617 B1 | 7/2017 | Ahuja et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |

(56) References Cited

U.S. PATENT DOCUMENTS

| | | |
|---|---|---|
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,057,356 B2 | 8/2018 | Sherman |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,432,669 B1 | 10/2019 | Badhwar et al. |
| 10,439,897 B1 | 10/2019 | Komarla et al. |
| 10,721,275 B2 | 7/2020 | Kung et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0126464 A1 | 7/2003 | McDaniel et al. |
| 2003/0161265 A1 | 8/2003 | Cao et al. |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |

(56) References Cited

U.S. PATENT DOCUMENTS

| | | |
|---|---|---|
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |

(56) References Cited

U.S. PATENT DOCUMENTS

| | | |
|---|---|---|
| 2011/0314546 A1 | 12/2011 | Aziz et al. |
| 2012/0011560 A1 | 1/2012 | Natarajan et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0224787 A1* | 8/2016 | Guy ................ G06F 3/04817 |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0314491 A1 | 10/2016 | Shani et al. |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0234459 A1 | 8/2018 | Kung et al. |
| 2018/0288077 A1 | 10/2018 | Siddiqui et al. |
| 2019/0327271 A1 | 10/2019 | Saxena et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe-r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

(56) References Cited

OTHER PUBLICATIONS

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doom, John Linwood Griffin, Stefan Berger., sHype: Secure Hypervisor Approach to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

Venezia, Paul, "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

MacDonald, Neil et al. "How to make Cloud IaaS Workloads More Secure Than Your Own Data Center" Gartner Research ID: G00300337,

(56) References Cited

OTHER PUBLICATIONS https://www.gartner.com/en/documents/3352444/how-to-make-cloud-iaas-workloads-more-secure-than-your-o, last accessed May 13, 2020.
U.S. Appl. No. 15/878,386 dated Jan. 23, 2018 Non-Final Office Action dated Nov. 12, 2019.
U.S. Appl. No. 15/878,386 dated Jan. 23, 2018 Notice of Allowance dated Mar. 3, 2020.

* cited by examiner

| CONFIGURATION PARAMETERS | PERFORMANCE | PERFORMANCE LEVEL | WEIGHTING | OPTIMAL RANGE |
|---|---|---|---|---|
| PROCESSOR_UTIL | 92 | OVER-UTILIZED | 0.50 | 60-80 |
| MEMORY_AVAIL | 300mb | OVER-UTILIZED | 0.20 | >500mb |
| VM_ACTIVE | 2 | OPTIMAL | 0.15 | 2-3 |
| PROCESS_NVM | 2 | UNDER-UTILIZED | 0.15 | 4-5 |

FIG. 6

SYSTEM AND METHOD FOR PREDICTING AND MITIGATING CYBERSECURITY SYSTEM MISCONFIGURATIONS

FIELD

Embodiments of the disclosure relate to cyber security. More particularly, one embodiment of the disclosure relates to a system and method for predicting the current performance level of a malware detection system and altering its configuration based on the predicted performance level.

GENERAL BACKGROUND

Network devices provide useful and necessary services that assist individuals in business and in their everyday lives. In recent years, a growing number of cyberattacks are being conducted on all types of network devices, especially network devices deployed at an enterprise (e.g., private or publicly-traded company, a governmental agency, etc.). In some cases, these cyberattacks are orchestrated in an attempt to gain access to content stored on one or more of these enterprise-based network devices. Such access is for illicit (i.e., unauthorized) purposes, such as spying or other malicious or nefarious activities. For protection, many enterprises deploy cybersecurity systems, such as on-premises malware detection systems that monitor and analyze content propagating over a local network in efforts to detect a cyberattack.

Typically, on-premises malware detection systems are installed in accordance with configurations that are either factory set or user-configurable, e.g., per specifications of installation guides provided by the manufacturers. Typically, these malware detection systems are initially configured to operate efficiently in accordance with network traffic patterns generally prevailing at the time of installation. Sometimes, the malware detection systems may not be properly configured by customers (users). Moreover, as network traffic patterns are dynamic and the threat landscape confronting customers may differ and may even change over time, in some situations, the malware detection systems' configurations should be tuned upon installation and re-tuned from time to time after installation for optimal its effectiveness.

In extreme situations, the malware detection systems may be significantly misconfigured, resulting in under-utilization of their detection capabilities or over-utilization of their detection capacity. This may reduce operational efficiencies or efficacies, or both, below that achievable by properly configured malware detection systems, and, in worse case scenarios, may result in inadequately analyzed network traffic and unnecessarily increased risk of a successful cyberattack on an enterprise. However, this activity of reconfiguring or tuning of the malware detection system is rarely performed due to both increased costs for the customer and a reduced availability of skilled technicians to perform such services.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 6 is an exemplary embodiment of an interactive dashboard of a second interface display screen to provide greater granularity in the analytic results illustrated by the first display screen of FIG. 5.

DETAILED DESCRIPTION

I. Overview

Figure 1:
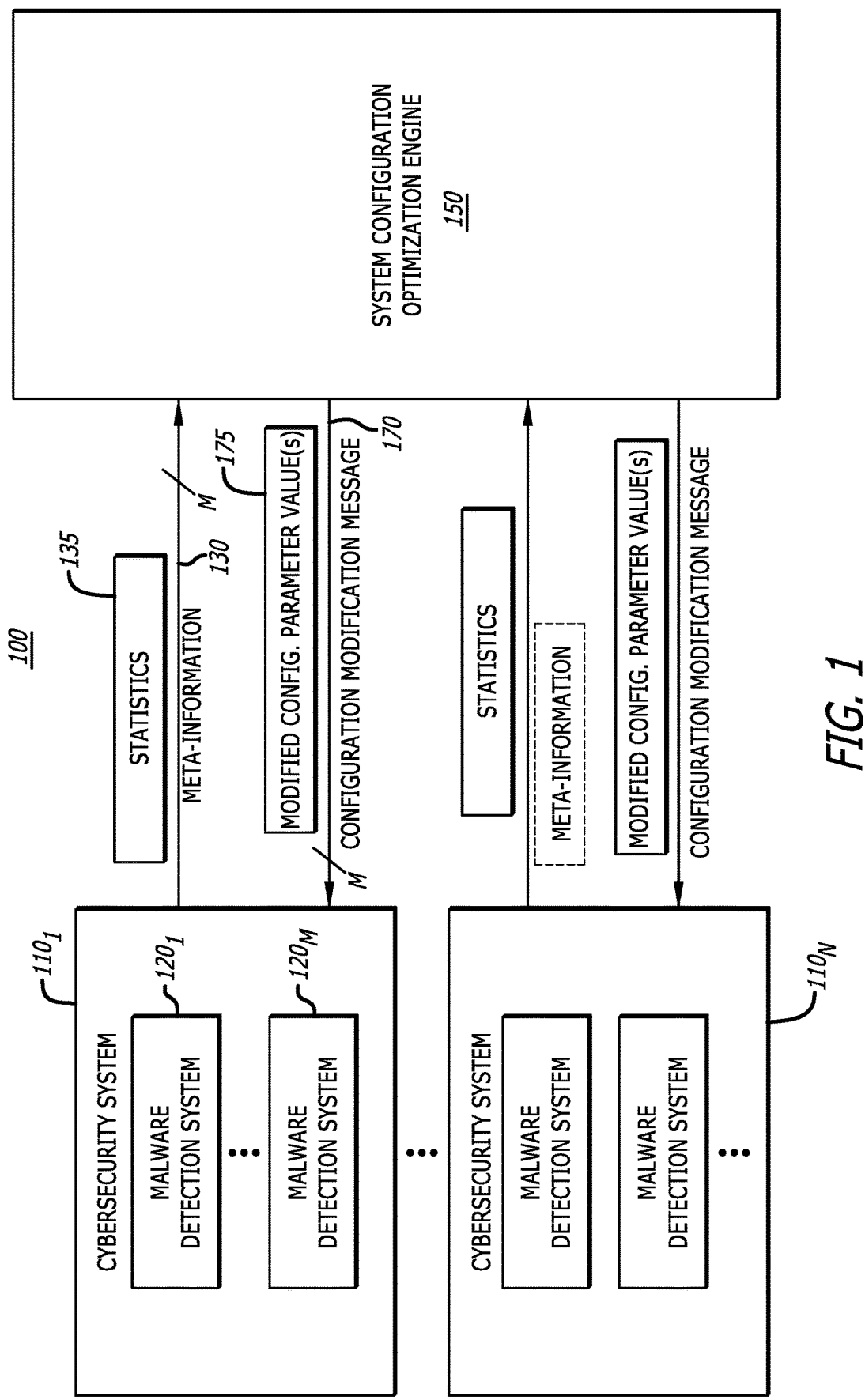
FIG. 1 is an exemplary embodiment of an architecture of a cybersecurity protection service.

In general, embodiments of the disclosure describe a system configuration optimization engine that is configured to (i) receive meta-information including different metrics associated with one or more malware detection systems (situated on-premises or as part of a cloud service), (ii) determine whether each of the malware detection system(s) is operating at an optimal performance level, and (iii) generate results provided as feedback to update one or more configuration parameter values for a particular malware detection system that is operating at a non-optimal performance level. Each configuration parameter includes information that partially controls the operating state of a resource (e.g., hardware, software or firmware) deployed within a network device (e.g., malware detection system). Examples of configuration parameters may be directed to hardware characteristics (e.g., number of active processor cores, memory capacity, utilization levels, etc.), operational settings such as virtual machine (VM) characteristics (e.g., number of active VMs, VM utilization, etc.), kernel related optimization (e.g. enable/disable kernel filters according to operating system performance, etc.) software characteristics (e.g., number of active processes, applications utilized by the active processes, etc.) or the like.

As described below, the system configuration optimization engine is remotely located from and communicatively coupled to one or more cybersecurity systems, which may be associated with different customers. A cybersecurity system includes one or more malware detection systems, each configured to provide meta-information to the system configuration optimization engine. The meta-information may include (a) a first metric being statistics associated with certain configuration parameters of the malware detection system, and/or (b) a second metric being events monitored during operations of the malware detection system (e.g., data retrieved in response to a certain event such as a system crash, etc.).

Based on the received meta-information, the system configuration optimization engine assigns a performance level for each malware detection system of a cybersecurity system. For illustrative purposes, the assigned performance level may be one of a plurality of performance levels, either (i) an optimal performance level or (ii) a non-optimal performance level. The non-optimal performance level may include multiple levels of granularity, such as an over-utilized performance level and an under-utilized performance level. The "optimal performance level" refers to a preferred operating state for a network device performing cybersecurity analyses, such as performed by a malware detection system for example, which may be measured by certain metrics, such as hardware utilization statistics, virtual machine utilization statistics, and/or software utilization statistics. A "non-optimal performance level" (e.g., over-utilized or under-utilized) identifies the malware detection system is operating outside of its desired operating configuration.

More specifically, as described herein, the system configuration optimization engine analyzes the meta-information provided by each malware detection system and, based on such analysis, assigns a performance level to that malware detection system. The meta-information may be provided to the system configuration optimization engine on a periodic basis and/or an aperiodic basis in response to a certain event (e.g., system crash, system operability exceeds or falls below a prescribed threshold, request initiated by a network administrator or cybersecurity system manufacturer, etc.).

As described above, the "optimal" performance level refers to a preferred operating state for a network device preforming cybersecurity analyses. This preferred operating state may be represented through a collection of system metrics, and thus, the performance level for a malware detection system may be determined through the collective analysis of configuration parameter values directed to these system metrics, which are provided as part of the meta-information. As part of this collective analysis, the system configuration optimization engine determines the degree of correlation between the received metrics in the meta-information and desired metrics of the malware detection system (referred to as a "baseline configuration") that are gathered using experiential knowledge of operational meta-information of known misconfigured malware detection systems and/or known optimal malware detection systems.

According to one embodiment of the disclosure, a baseline configuration may include certain hardware utilization threshold (or range), VM utilization threshold (or range), and/or software utilization threshold (or range) representing a desired operating configuration for a malware detection system with a certain hardware profile. Hence, the system configuration optimization engine may include a plurality of baseline configurations each associated with a different hardware profile (e.g., number of processors, memory size, etc.). When analyzing the performance level for a malware detection system, a baseline configuration may be selected based on the hardware profile for that malware detection system, along with other factors (e.g., threat landscape confronting the customer (for instance, as indicated by the industry protected by the malware detection system), subscription or customer type, etc.). For instance, given the same hardware profile, a malware detection system deployed for a customer in a high-risk industry (e.g., governmental defense agency, utility, etc.) may be assigned a more stringent baseline configuration (e.g., less range tolerance, different weighting scheme targeted to ensure higher average performance levels, etc.) than a baseline configuration reserved for malware detection systems deployed in lower-risk industries (e.g., textiles, etc.). As a result, subscription levels for malware detection systems deployed for high-risk industry customers may be more costly given a likely increased frequency of re-configuration of the malware detection system for placement into an optimal performance level.

According to one embodiment of the disclosure, the performance level for the malware detection system is determined by conducting one or more arithmetic or logical operations on performance level determinations conducted for a plurality of metrics provided as part of the meta-information. More specifically, each statistic of a configuration parameter may be assigned a weighting depending on its importance in representing the health of the malware detection system. For instance, a first statistic directed to processor utilization may be assigned a larger weighting (i.e., assigned a higher importance) than a second metric directed to the number of virtual machines (VMs) currently active. Hence, the performance level for the malware detection system is based on a collection of weighted, performance level determinations (e.g., over-utilized, optimal, under-utilized) based on the statistics provided as part of the meta-information.

Responsive to the meta-information, the system configuration optimization engine may be configured to return information (referred to as a "system health report") to the malware detection system supplying the meta-information. For one embodiment, the system health report includes (i) an identifier of the malware detection system supplying the analyzed meta-information; (ii) a determined performance level for the malware detection system; (iii) the performance level determinations for some or all of the plurality of configuration parameters; and/or (iv) one or more modified configuration parameter values that are used by the malware detection system to adjust its configuration to better remain in or return to an optimal performance level.

The system configuration optimization engine may be configured, prior to selection and passing of one or more modified configuration parameter values to the malware detection system, to select the modified configuration parameter values by at least comparing the received meta-information to predefined operational bounds (e.g., a blacklist including one or more statistics associated with configuration parameters for devices with the same hardware profile operating at non-optimal performance levels (e.g., misconfigured systems, etc.), and/or whitelist including statistics of configuration parameters for devices with the same hardware profile operating at optimal performance levels). Additionally, the system configuration optimization engine may provide the modified configuration parameter values to a monitoring and reporting service, which may issue an alert to a customer of the malware detection systems upon determining that one or more of the malware detection systems is operating at a non-optimal performance level.

According to one embodiment of the disclosure, the configuration of a malware detection system operating at a non-optimal performance level may be updated automatically without customer approval. Alternatively, before configuration parameter value(s) for the particular malware detection system are updated, approval from the network administrator is needed. Herein, administrator approval may be secured by a network device implemented with the system configuration optimization engine prior to providing the results (i.e., one or more modified configuration parameter value(s) as feedback to the particular malware detection system.

As an illustrative example, the network device may send an alert message to the administrator (e.g., text, email, notice to access a dashboard, etc.), where the alert message requires an action by the administrator before the modified configuration parameter values are sent. The action may include, but is not limited or restricted to any reply mechanism such as selection of a radio button, selection of a display element (or entry of information) on the dashboard, or the like. As another illustrative example, the network device may send the modified configuration parameter values to the particular malware detection system and provide the results as input to a monitor/reporting service, which generates a display that is accessible by at least an authorized administrator and illustrates performance levels of the malware detection systems utilized by a customer. Any of these types of reply mechanisms allows the network administrator to interact with the dashboard to authorize the configuration parameter update.

II. Terminology

In the following description, certain terminology is used to describe various features of the invention. For example, each of the terms "logic," "engine," and "component" may be representative of hardware, firmware or software that is configured to perform one or more functions. As hardware, the term logic (or engine or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or engine or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

Herein, a "message" generally refers to related data that is received, transmitted, or exchanged over a communication session. The message may include one or more packets, where a "packet" broadly refers to a series of bits or bytes having a prescribed format. Alternatively, the data may include a collection of data that may take the form of an individual or a number of packets carrying related payloads, e.g., a single webpage received over a network.

The term "object" generally relates to content (or information for accessing such content) having a logical structure or organization that enables the object to be classified for purposes of malware analysis. The content may include an executable (e.g., an application, program, code segment, a script, dynamic link library "dll" or any file in a format that can be directly executed by a computer such as a file with an ".exe" extension, etc.), a non-executable (e.g., a file; any document such as a Portable Document Format "PDF" document; a word processing document such as Word® document; an electronic mail "email" message, web page, etc.), or simply a collection of related data (e.g., packets).

The term "computerized" generally represents that any corresponding operations are conducted by hardware in combination with software and/or firmware. The term "data store" generally refers to a data storage device such as the non-transitory storage medium described above, which provides non-persistent or persistent storage for information (e.g., data, meta-information, etc.).

According to one embodiment of the disclosure, the term "malware" may be broadly construed as any code, communication or activity that initiates or furthers a cyberattack. Malware may prompt or cause unauthorized, anomalous, unintended and/or unwanted behaviors or operations constituting a security compromise of information infrastructure. For instance, malware may correspond to a type of malicious computer code that, as an illustrative example, executes an exploit to take advantage of a vulnerability in a network, network device or software, to gain unauthorized access, harm or co-opt operations of the network, the network device of the software or to misappropriate, modify or delete data. Alternatively, as another illustrative example, malware may correspond to information (e.g., executable code, script(s), data, command(s), etc.) that is designed to cause a network device to experience anomalous (unexpected or undesirable) behaviors. The anomalous behaviors may include a communication-based anomaly or an execution-based anomaly, which, for example, could (1) alter the functionality of a network device executing application software in an atypical manner; (2) alter the functionality of the network device executing that application software without any malicious intent; and/or (3) provide unwanted functionality which may be generally acceptable in another context.

The term "network device" may be construed as any electronic computing system with the capability of processing data and connecting to a network. The network may be a public network such as the Internet and/or a local (private) network such as an enterprise network, a wireless local area network (WLAN), a local area network (LAN), a wide area network (WAN), or the like. Examples of a network device may include, but are not limited or restricted to an endpoint (e.g., a laptop, a mobile phone, a tablet, a computer, a video console, a copier, etc.), a network appliance, a server, a router or other intermediary communication device, a firewall, etc.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device such as one or more Application Programming Interfaces (APIs).

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring to FIG. 1, an exemplary block diagram of an embodiment of an architecture of a cybersecurity protection service 100 is shown. Herein, the cybersecurity protection service 100 features one or more cybersecurity systems $110_1$-$110_N$ (N≥1) communicatively coupled to a system configuration optimization engine 150. Deployed for detecting and protecting a local network of a customer against cyberattacks, each of the cybersecurity systems $110_1$-$110_N$ (e.g., cybersecurity system $110_1$) includes one or more malware detection systems $120_1$-$120_M$ (M≥1). As shown, the malware detection systems $120_1$-$120_M$ may be deployed on-premises (in the local network) to detect and analyze incoming objects propagating into or through the local network for malware. Alternatively, the malware detection systems $120_1$-$120_M$ may be deployed as a cloud-based solution in which the incoming objects (or a representation thereof) are captured at the local network and provided to at least one of the cloud-based malware detection systems $120_1$-$120_M$.

Herein, each of the malware detection system $120_1$-$120_M$ may be configured to perform a two-phase approach for detecting malware contained in network traffic. This two-phase approach includes a static phase and a dynamic phase. During the static phase, an initial analysis of the characteristics of an object is conducted, without execution or processing of the object, to determine whether the object is "malicious" (malware) or "benign" (not malware). Where the object is "suspicious" (e.g., inconclusive if malicious or benign), a further (dynamic) analysis of the object may be conducted. During the dynamic phase, the object is executed within one or more virtual machines. A virtual machine (VM) executes an incoming object and the behaviors of these objects during execution (or the VM) are monitored. Each behavior may also referred to as an "event." In some embodiments, one or more malware detection system $120_1$-$120_M$ (e.g., malware detection system $120_1$) may be deployed as a network device, which is communicatively coupled to receive and analyze objects within network traffic. As a network device, the malware detection system $120_1$ includes logic being physical components that analyze objects for malware. Alternatively, the malware detection system $120_1$ may be deployed as a virtual device, namely a software (daemon) agent to detect cyberattacks that is operating (in the foreground or background) within a network device (e.g., an endpoint). An example of the two-phase malware detection system is described in U.S. Pat. No. 9,311,479, entitled, "Correlation and Consolidation of Analytic Data For Holistic View of A Malware Attack," and U.S. Pat. No. 9,483,644 entitled "Methods for Detecting File Altering Malware in VM based Analysis," the entire contents of both of which are hereby incorporated by reference.

As shown in FIG. 1, each malware detection system $120_1$, . . . , or $120_M$ is configured to transmit meta-information 130 to the system configuration optimization engine 150. Such transmission may be initiated periodically upon detection of a timeout condition (e.g., prescribed amount of time has elapsed, prescribed count value achieved, certain period of time detected, etc.) or aperiodically upon detection of a predetermined event (e.g., a system crash, completion of analyses of a prescribed number of objects, etc.). For instance, from the malware detection system $120_1$, the meta-information 130 may include statistics 135 associated with one or more configuration parameters that identify a current operating state of the malware detection system $120_1$. The statistics 135 may include, but are not limited or restricted to, measured values associated with certain configuration parameters, such as hardware utilization statistics, virtual machine utilization statistics, and/or software utilization statistics, as described above. Additionally, or in the alternative, the meta-information may include events as described herein.

Figure 2:
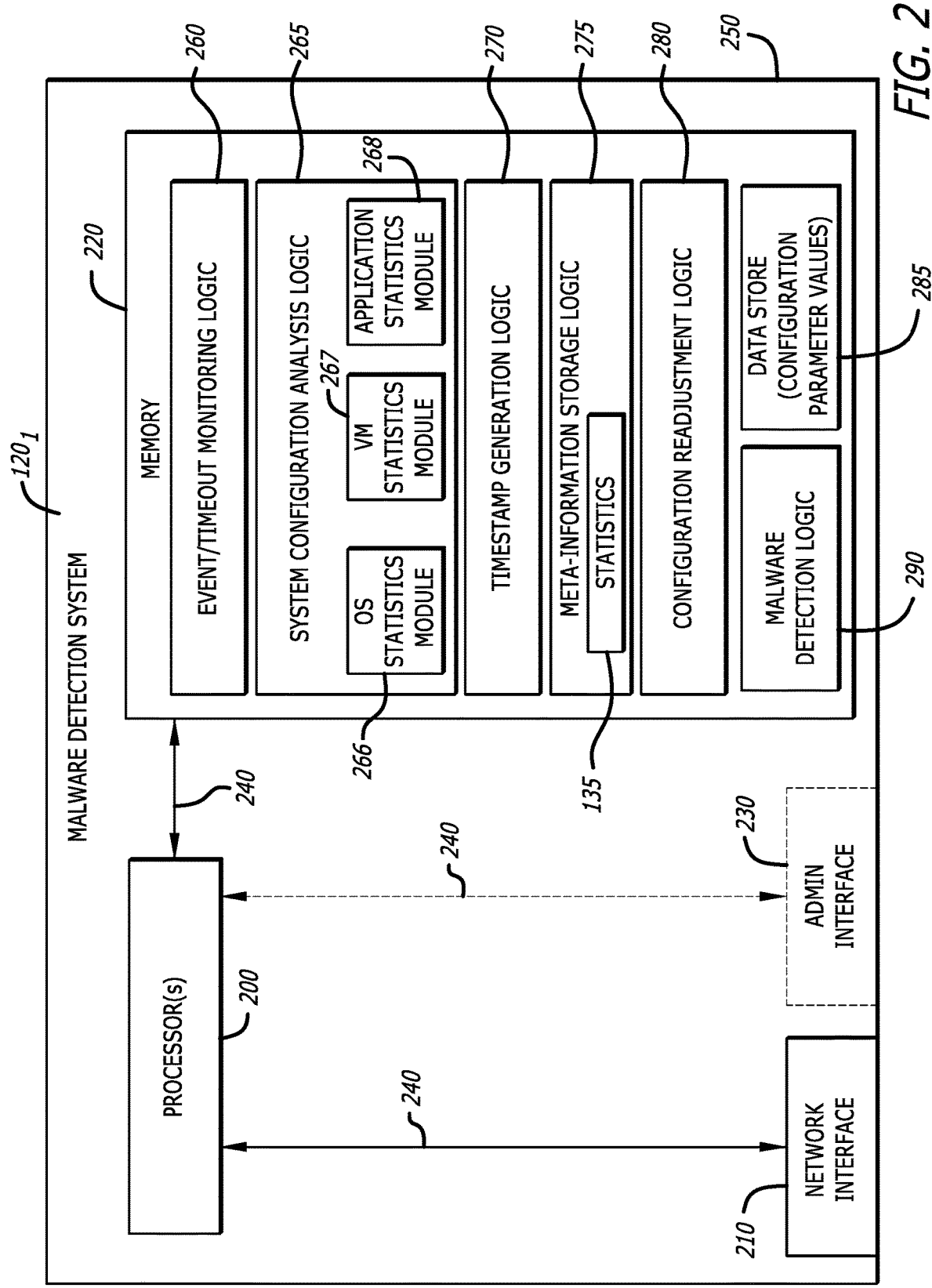
FIG. 2 is an exemplary embodiment of a malware detection system of FIG. 1.

According to one embodiment of the disclosure, for any deployment of a malware detection system, certain component(s) within the malware detection system $120_1$ periodically or aperiodically determine the current operating state of the malware detection system. As an illustrative example, as shown in FIGS. 1-2, system configuration analysis logic 265 may be configured, in response to a timeout or predetermined event detected by monitoring logic 260, to ascertain statistics associated with certain configuration parameters. The statistics may be collected via the OS. The configuration parameter values may be temporarily stored prior to transmission to the system configuration optimization engine 150.

Referring back to FIG. 1, the system configuration optimization engine 150 may be implemented within a dedicated network device, which is located remotely from the cybersecurity systems $110_1$-$110_N$. As an illustrative embodiment, the system configuration optimization engine 150 may be deployed as logic being part of public cloud computing or private cloud computing (e.g., private cloud, a virtual private cloud or a hybrid cloud). When operating as part of public cloud computing, the system configuration optimization engine 150 is accessible by each of the cybersecurity systems $110_1$-$110_N$ via a public network, as public cloud computing supports a multi-tenant environment. In contrast, when operating as part of private cloud computing, the system configuration optimization engine 150 is accessible by a single cybersecurity system (e.g., cybersecurity system $110_1$) where each of the cybersecurity systems $110_1$-$110_N$ is associated with a different customer as private cloud computing supports a single-tenant environment.

Upon receipt of the meta-information 130 from the cybersecurity system $110_1$, the system configuration optimization engine 150 analyzes the meta-information 130 to determine whether the malware detection system $120_1$ is operating at an optimal performance level. Such analysis may involve an evaluation of the meta-information 130 against a predictive model based on heuristic information including configuration parameter values of a known body of past configurations (e.g., blacklist and/or whitelist and/or hardware profile) that are associated with non-optimal and/or optimal performance levels. By identifying the misconfigurations, the system configuration optimization engine 150 may recommend modifications to the malware detection system configuration. These modifications are alerted to the customer and/or directly provided to the malware detection system(s).

According to one embodiment of the disclosure, the determination whether the malware detection system $120_1$ is operating at an optimal performance level, namely a preferred operating state for malware detection analyses as measured by metrics such as system parameter values and/or detection parameter values. Collectively, these configuration parameter values identify a health of the malware detection system $120_1$ or the cybersecurity system $110_1$ including at least the malware detection system $120_1$. Herein, the system parameters may be directed to features that influence operability of the malware detection system $120_1$, such as hardware utilization statistics (e.g., processor utilization, amount or degree of available memory for storage, etc.), virtual machine utilization statistics (e.g., virtual machine "VM" utilization or the number of VMs activated, etc.) and/or software utilization statistics (e.g., what processes are running, statistics associated with the processes, queue length, etc.). In contrast, the detection parameters may be directed to features associated with a malware detection analysis being conducted (e.g., type of analyses, duration of analysis per object, classification threshold being used to determine performance level, etc.

As an example, as described above, when adjusting the detection parameter values, the type of analysis may be varied (dynamic, emulation, types of static analysis, etc.) or the thresholds that determine suspiciousness (requiring further analysis e.g., dynamic analysis) may be varied in order to control the number of objects that are subjected to further analysis. For under-utilization, by changing the threshold to a lower level, we may subject more objects to deeper analysis (e.g., dynamic) which increases consumption of available system resources and increases the rate of object analysis. The additional objects subject to further analysis caused by a reduced threshold may have a lower probability (based on preliminary analysis only) of being malicious. However, such analysis may reduce the number of false negatives. For over-utilization, by raising the threshold, fewer objects may be subject to further (dynamic) analysis. As the threshold is related to likelihood of maliciousness, adjustment may be slow to ensure that there is no appreciable increase the risk of false negatives. The availability of such adjustments may be related to the prevailing threat landscape for the particular customer protected by the system, or its industry, In response to determining that the malware detection system $120_1$ is operating at a non-optimal performance level representing that the malware detection system $120_1$ is operating outside of its desired operating configuration (e.g., under-utilized or over-utilized), the system configuration optimization engine 150 may be configured to recommend configuration modifications for the malware detection system $120_1$ and return a configuration modification message 170. The configuration modification message 170 may include one or more modified configuration parameter values 175, which may be a different values than the received configuration parameter value 135. Upon modification of the configuration of the malware detection system $120_1$ in accordance with the modified configuration parameter values 175, either automatically or upon approval by an administrator as described above before the automated solution is given effect (e.g., agreement as to the modifications, accept increased charges if applicable, etc.), the functionality of the malware detection system $120_1$ is modified in efforts to return to an optimal performance level.

As an illustrative example, the configuration modification message 170 may include a modified configuration parameter value 175 signifying a change in the number of active virtual machines currently being utilized by the malware detection system $120_1$, as represented by the statistics 135 (e.g., inclusive of statistics associated with the number of active virtual machines) provided within the meta-information 130. Herein, according to one embodiment, the malware detection system $120_1$, upon receipt of the modified configuration parameter value 175 (with administrator approval if needed), may decrease the number of active virtual machines deployed, provided the malware detection system $120_1$ is determined by the system configuration optimization engine 150 to be operating at an "over-utilized" VM utilization level. Herein, the "over-utilized" VM utilization level may be determined by any configuration parameter value or combination of configuration parameter values indicating that available resources at the malware detection system $120_1$ are incapable of supporting the current performance level (e.g., the number of VMs running concurrently, number of objects queued and awaiting VM analysis, etc.), and the modified configuration parameter value 175 temporarily reducing the performance level of the malware detection system $120_1$. Alternatively, according to another embodiment, upon receipt of the modified configuration parameter value 175 (with administrator approval if needed), the malware detection system $120_1$ may increase in number of active virtual machines from the number of active virtual machines represented by the statistics 135, provided the malware detection system $120_1$ is operating at an "under-utilized" VM utilization level where resources at the malware detection system $120_1$ are available to support a higher performance level (e.g., more VMs, etc.).

Referring to FIG. 2, an illustrative embodiment of a malware detection system (e.g., malware detection system $120_1$) is shown. Herein, the malware detection system $120_1$ features a plurality of components, including a processor 200, a network interface 210, a memory 220, and an optional administrative interface 230, which are communicatively coupled together via a transmission medium 240. As shown, when deployed as a network appliance, the components are at least partially encased in a housing 250 made entirely or partially of a rigid material (e.g., hardened plastic, metal, glass, composite, or any combination thereof). The housing 250 protects these components from environmental conditions. As a virtual device, however, the malware detection system $120_1$ includes some or all of the functionality provided by the logic within the memory 220.

The processor 200 is a multi-purpose, programmable component that accepts digital data as input, processes the input data according to stored instructions, and provides results as output. One example of a processor may include an Intel® central processing unit (CPU) with an x86 instruction set architecture. Alternatively, the processor 200 may include another type of CPU, a digital signal processor (DSP), an Application Specific Integrated Circuit (ASIC), a field-programmable gate array (FPGA), or the like.

As shown in FIG. 2, the processor 200 is communicatively coupled to the memory 220 via the transmission medium 240. According to one embodiment of the disclosure, the memory 220 is adapt to store (i) event/timeout monitoring logic 260, (ii) system configuration analysis logic 265, (iii) optional timestamp generation logic 270, (iv) meta-information storage logic 275, (v) configuration readjustment logic 280 and corresponding data store 285, and (vi) malware detection logic 290.

The configuration analysis logic 265, in response to a particular event or timeout detected by the monitoring logic 260, obtains meta-information (e.g., one or more configuration parameter values 135) associated with the current operating state of the malware detection system $120_1$. As shown, the configuration analysis logic 265 includes an operating system (OS) statistics module 266 to collect hardware utilization statistics from the OS (e.g., processor utilization, amount or degree of available memory for storage, etc.); VM statistics module 267 to collect VM utilization statistics (e.g., VM utilization or the number of VMs activated, etc.); and/or application statistics module 268 to collect software utilization statistics (e.g., what processes are running, statistics associated with the processes, etc.).

Thereafter, the configuration analysis logic 265 may temporarily store statistics associated with certain configuration parameter(s) 135 (hereinafter, "statistics") within the meta-information storage logic 275. As an optional operation, the timestamp generation logic 270 may generate a timestamp (not shown) that is applied to each value of the statistic 135 prior to storage with the meta-information storage logic 275. The statistics 135 may include the processor utilization level, the amount of hard disk space available, number of active virtual machines, the number of processes currently running, or the like. The current configuration parameter values 135, stored in the meta-information storage logic 275, are subsequently accessed from the meta-information storage logic 275 for transmission to the system configuration optimization engine 150 of FIG. 1.

The configuration readjustment logic 280 is adapted to receive the configuration information 170 (i.e., modified configuration parameter values 175) from the system configuration optimization engine 150 of FIG. 1 for storage with the data store 285. The configuration readjustment logic 280 (e.g., a script running on the malware detection system $120_1$) is configured to change the operating state of the malware detection system $120_1$ by altering certain configuration parameter values with the values included in the modified configuration parameter values 175. The adjustment of the current configuration parameter values, represented by the statistics 135, may occur upon receipt of the modified configuration parameter values 175 or after the configuration readjustment logic 280 initiates a message to an administrator to approve alteration of the operating state of the malware detection system $120_1$ with the modified configuration parameter values 175. Alternatively, the current configuration parameter values may be adjusted in response to a change in operating state by the malware detection system $120_1$ such as initialization of a new process or a time in which the processor utilization falls below a first predetermined value or exceeds a second predetermined value different than the first predetermined value.

The administrative interface 230 is a portal that allows an administrator, after credential exchange and authentication, to access and update logic stored within the memory 220 of the malware detection system $120_1$. For instance, the administrative interface 230 may include authentication logic (not shown) to authenticate an administrator requesting access to stored logic within the malware detection system $120_1$. Upon authentication, the administrator is able to modify (i) the triggering events or timeout parameters within the event/timeout monitoring logic 260, or (ii) code of the system configuration analysis logic 265, configuration readjustment logic 280, and/or malware detection logic 290 (e.g., code associated with static analysis of an object or the behavioral analysis of the object in efforts to detect a presence of malware within the object or its association with a cyber-attack), or (iii) operability of the malware detection system $120_1$ (e.g., hardware changes, operational setting changes or software changes as described below).

Figure 3:
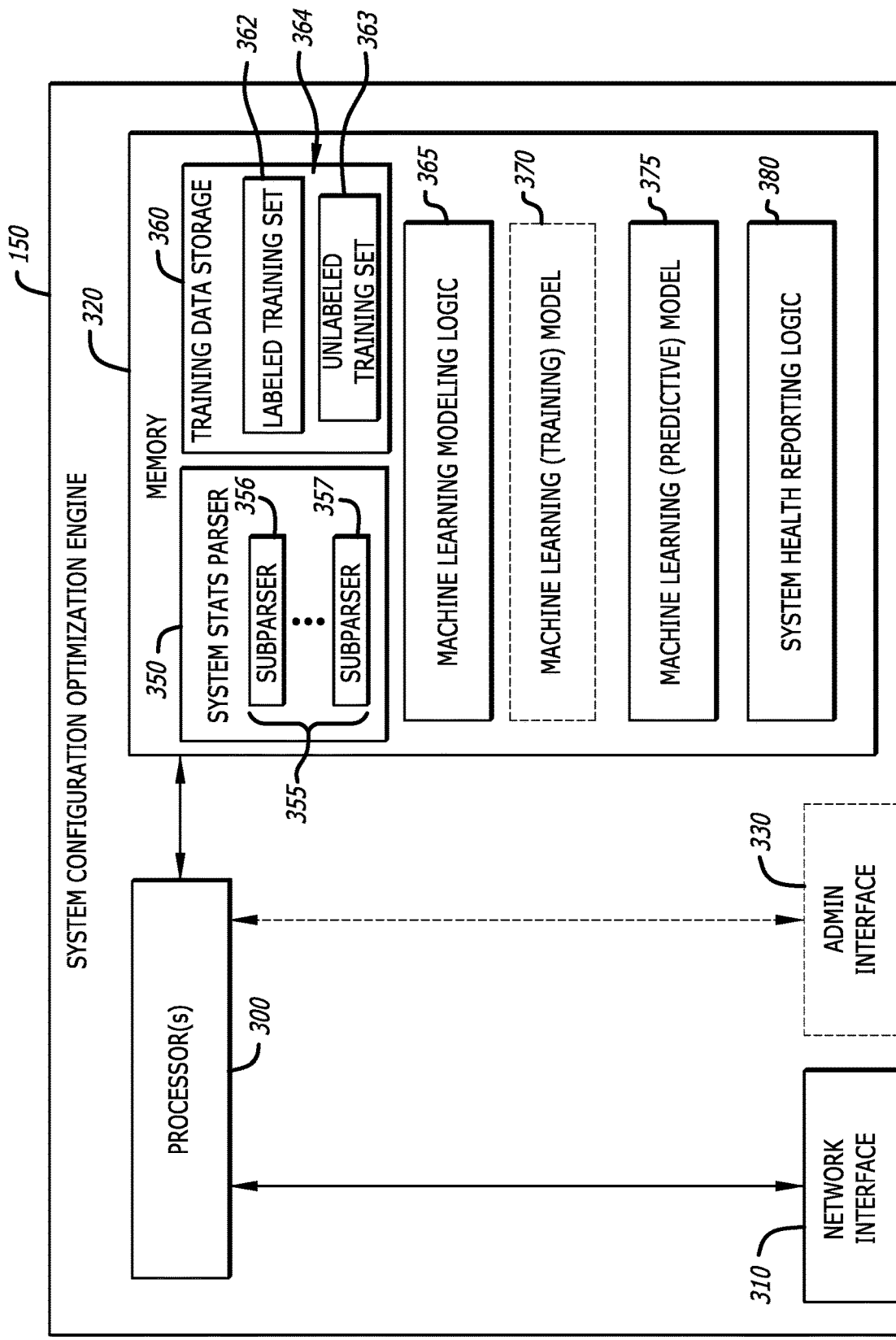
FIG. 3 is an exemplary embodiment of the system configuration optimization engine of FIG. 1.

Referring now to FIG. 3, an exemplary embodiment of the system configuration optimization engine 150 of FIG. 1 is shown. The system configuration optimization engine 150 features one or more processors 300, a network interface 310, a memory 320, and an optional system administrative interface 330 which allows an administrator to directly access to data within the system configuration optimization engine 150 (e.g., adjust the code associated with any of the components set forth in the memory 320 when the administrator is authorized to perform such actions).

As shown, the memory 320 comprises a parser 350, training data storage 360, machine learning (ML) modeling logic 365, ML training model 370, ML predictive model 375, and system health reporting logic 380. Herein, the parser 350 is configured to parse both structured and non-structured data, which is provided as meta-information 130 from a malware detection system (e.g., malware detection system $120_1$). More specifically, the parser 350 features a plurality of sub-parsers 355, including a first sub-parser 356 and a second sub-parser 357. The first sub-parser 356 is configured to parse structured data to recover meta-information including the values associated with one or more configuration parameters positioned at specific locations within the structured data (hereinafter, "recovered configuration parameter values"). The recovered configuration parameter values may be analyzed by the ML modeling logic 365 in accordance with the ML predictive model 375. The second sub-parser 357 is configured to parse unstructured data (e.g., line in a text file) for relevant information, including information associated with an event. For instance, the second sub-parser 357 may conduct a search for one or more keywords (e.g., "kernel crash" keyword, etc.) and extract information subsequent to the keywords (e.g., information identifying a nature and/or reason for the crash).

The training data storage 360 is a data store that is adapted to temporarily store sets of labeled training set 362 and/or unlabeled training set 363 (referred to as "training data" 364) for use by the machine learning modeling logic 365 in "training" the ML training model 370 to produce the ML predictive model 375. The training data storage 360 may include data from the cybersecurity systems $110_1$-$110_N$ as well as third party sources. Herein, the training data 364 include normalized, heuristic data pertaining to a plurality of configuration parameters directed to operability of a malware detection system, where some of the heuristic data may be directed to the same configuration parameter associated with a different hardware profile. The heuristic data may include a normalized value for a specific configuration parameter over a prescribed time period, as measured for a network device with a specific hardware profile over a prescribed time period. Alternatively, the heuristic data may include a prescribed number of sampled values. A "hardware profile" is a specific representation of a network device having certain functionality, such as a number of processing elements (e.g., processors, processor cores, etc.), certain memory storage capacity, certain VM capacity, manufacturer/model name of the network device, device identification number, or the like.

For different hardware profiles, each training data set 364 may correspond to a different configuration parameter, a different combination of configuration parameters, and/or different configuration parameter values or weighting used by different classifications. Stated differently, the ML modeling logic 365 uses the training data sets 364 to establish baselines in classifying incoming meta-information 130 (using the received configuration parameter values), and these baselines may vary between hardware profiles. Furthermore, the ML predictive model 375 may be trained to apply different weighting factors for different configuration parameters to determine a verdict for each incoming configuration parameter and/or an aggregate of weighted configuration parameters for classifying of the malware detection system $120_1$ providing the meta-information 130.

According to one embodiment of the disclosure, each set of training data 364 includes normalized, heuristic data associated with one or more configuration parameters, where the training data 364 is labeled to correspond to a particular classification of a plurality of classifications. Based on the foregoing, each classification of the training data 364 may correspond to a different aggregation of configuration parameter values as different hardware profiles may be associated with different normalized, heuristic data operating as a baseline and/or different weighting factors assigned to configuration parameter values for determining a verdict for each incoming configuration parameter value and an aggregate of weighted configuration parameter values.

The machine learning modeling logic 365 processes the ML training model 370 using the labeled training data 362 as well as unlabeled training data 363 to produce the updated predictive model 375. For instance, using the labeled training data 362, the ML training model 370 continues to update and improve the detection accuracy of the ML training model 370 until a prescribed accuracy (e.g., 90% accuracy) is achieved. Thereafter, the ML training model 370 is released for initial testing as the ML predictive model 375, and based on continued reliable testing of the ML predictive model 375, the ML predictive model 375 is utilized by the system configuration optimization engine 150 for determining whether certain malware detection systems are operating at an optimal performance level or a non-optimal performance level. Thereafter, the ML training model 370 (corresponding to the current ML predictive model) continues further training to improve operability of the ML predictive model 375.

The system health reporting logic 380 is adapted to receive the incoming meta-information and utilize the ML predicted model 375 in (1) determining whether the malware detection system is operating at an optimal performance level or not, and (2) determining what configuration parameters are modifiable in order for the malware detection system $120_1$ to be adjusted to operate at the optimal level. The system health reporting logic 380 may perform a number of operations iteratively by modifying different configuration parameters and analyzing the results of the modification to determine whether certain configuration parameter values provided by the meta-information gravitate toward the optimal performance level.

For instance, the system health reporting logic 380 may detect that an "over-utilized" processor utilization level (e.g., exceeding a first threshold such as a percentage of processing capacity exceeding 80% utilization where optimal utilization resides within 60%-80% range), and thus, mimic activation of additional processor cores in order to determine whether the activation of a single processor core would be sufficient to reduce the processor utilization level back to an optimal performance level (e.g., operating utilization normalized to reside within 60%-80% range). Hence, the system health reporting logic 380 performs behavioral analysis in accordance with the hardware profile in order to determine that the alteration of certain configuration parameter values is sufficient to return the malware detection system back to an optimal operating range. Besides percentage of processing capacity, the utilization level may be directed to the time spent on idle tasks (e.g., optimal performance level corresponds to a prescribed percentage range of processing time being spent on idle tasks where over-utilization exceeds the prescribed percentage range) or the type and/or amount of computing tasks being performed for a determined measure of time such as per second, hour, day or the like (e.g. the optimal performance level may correspond to a prescribed range of computing tasks performed according to the determined measure of time, where over-utilization exceeds the prescribed computing task range).

Similarly, the system health reporting logic 380 may detect that an "under-utilized" processor utilization level (e.g., utilizing falling below a second threshold such as 30% utilization where utilization normalized to reside within 60%-80% range), and thus, mimic deactivation of a processor core if multiple processor cores are active in order to determine whether the deactivation of a single processor core would be sufficient to increase the processor utilization level back to the optimal performance level. Furthermore, processor under-utilization may be detected where the processing time being spent on idle tasks falls below the prescribed processing range or the number of computing tasks performed over the measured unit of time falls below the prescribed computing task range.

Figure 4:
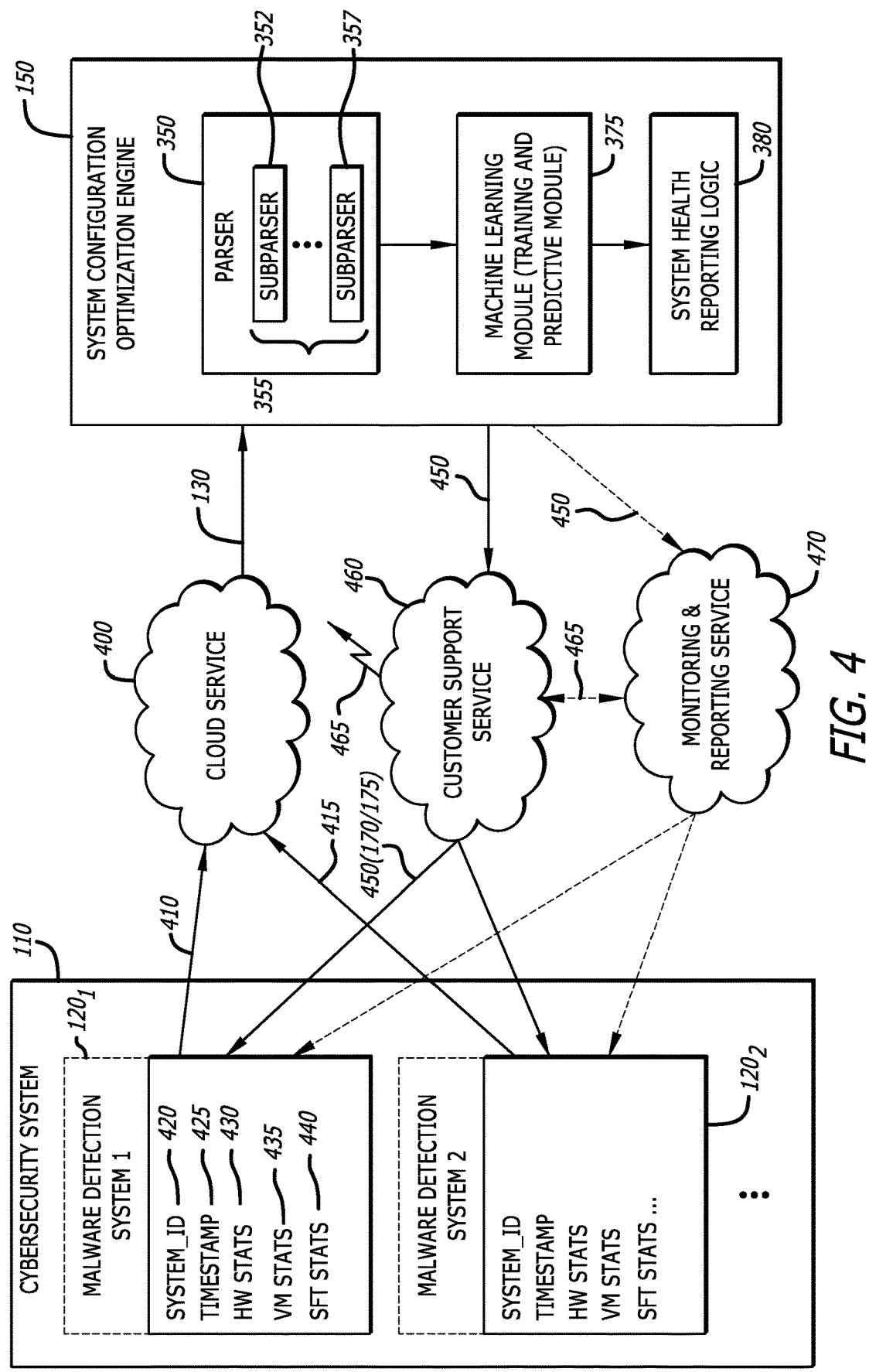
FIG. 4 is a first exemplary embodiment of an operation flow between a cybersecurity system and the system configuration optimization engine of FIG. 1.

Referring to FIG. 4, a first exemplary embodiment of an operation flow between a cybersecurity system $110_1$ and the system configuration optimization engine 150 is shown. Herein, both the malware detection systems $120_1$ and $120_2$ communicate with a cloud service 400, which operates as a datacenter that aggregates meta-information 130 received from malware detection systems $120_1$ via a first message 410 and meta-information 1302 received from malware detection systems $120_2$ via a second message 415. As shown, one embodiment of the first message 410 may include an identifier of the malware detection system $120_1$ (e.g., System ID 420), an optional timestamp 425, and statistics 135 associated with one or more configuration parameters representing the system metrics, such as hardware utilization statistics 430 (e.g., processor or memory-based statistics), virtual machine utilization statistics 435 (e.g., VM-based statistics) and/or software utilization statistics 440 (e.g., process-based statistics) as described above.

During aggregation, according to one embodiment of the disclosure, the unstructured data within the meta-information 130 may be formatted and placed into a prescribed data structure. Otherwise, the meta-information 130, including structured and/or unstructured data, may be provided to the system configuration optimization engine 150. According to one embodiment of the disclosure, the cloud service 400 controls delivery of the meta-information 130 (e.g., "push" delivery) while, according to another embodiment, the system configuration optimization engine 150 controls delivery of the meta-information 130 (e.g., "pull" delivery).

As shown, the system configuration optimization engine 150 includes the parser 350, which features a plurality of sub-parsers 355 including the first sub-parser 356 and the second sub-parser 357. As described above, the first sub-parser 356 is configured to parse structured data contained in the meta-information 130 in order to recover one or more configuration parameter values. The recovered configuration parameter values are used by the ML predictive model 375, being processed by the ML modeling logic (not shown), in determining a performance level at which the malware detection system $120_1$ is currently operating. Additionally, the ML predictive model 375, being processed by the ML modeling logic 365 of FIG. 3, determines the performance level (e.g. values) for each of the recovered configuration parameter values.

Additionally, the second sub-parser 357 is configured to parse unstructured data for relevant information (e.g., analysis of text strings such as lines of a text file). The "relevant" information includes information associated with a monitored event, where the information may be obtained from keyword searches, as described above. The relevant information may be used by the ML modeling logic in determining, independent or in combination with the recovered configuration parameter values, the performance level at which the malware detection system $120_1$ is currently operating.

More specifically, the ML modeling logic 365 is applied to the configuration parameter value(s) and/or relevant information are provided to the ML modeling logic 365. The ML predictive model 375 is generated as a result of the ML modeling logic performing "training" operations on the ML training model using the training data as described in FIG. 3. Herein, the ML predictive model 375 determines the hardware profile of a source of the configuration parameter value(s) and/or relevant information, where the hardware profile may influence what normalized, heuristic data is referenced in the classification of the source. For instance, using the ML predictive model 375, the ML modeling logic analyzes portions of the meta-information 130 (e.g., recovered configuration parameter statistics and/or the relevant information) to classify the malware detection system $120_1$ (e.g., over-utilized performance level, optimal performance level, or under-utilized performance level).

As described above, the classification operations are dependent on detected hardware profile for the malware detection system $120_1$ and the content of the configuration parameters supplied by the meta-information 130. For example, the ML predictive model 375 may apply prescribed weightings to the configuration parameter values, where the aggregate of the weighted values is used to determine whether the malware detection system is operating at an optimal performance level, or is operating at a non-optimal performance level (e.g., over-utilized where processor utilization exceeds a first prescribed percentage and/or memory available falls below a first prescribed byte size or under-utilized where processor utilization falls below a second prescribed percentage and/or memory available exceeds a second prescribed byte size).

The system health reporting logic 380 is adapted to receive the incoming meta-information and utilize the ML predicted model 375 to determine (1) whether the malware detection system is operating at an optimal performance level or not, and (2) determine what configuration parameters are modifiable for adjusting operability of the malware detection system $120_1$ to operate at the optimal performance level. The system health reporting logic 380 may iteratively modify certain configuration parameters based on what configuration parameters are negatively influencing performance, and using the resulting affects as feedback to adjust the next iteration so as to tune in steps to a value or values that produces an optimal performance level the configuration of the malware detection system $120_1$. This analysis may be performed through behavioral analysis of a virtual machine configured to accordance with a determined hardware profile or through heuristics based on prior configuration parameter adjustments. For instance, the system health reporting logic 380 may detect that an "over-utilized" processor utilization level, and thus, mimic activation of additional processor cores in order to determine whether the activation of a single processor core would be sufficient to reduce the processor utilization level back to an optimal performance level (e.g., operating utilization normalized to reside within 60%-80% range). Hence, the system health reporting logic 380 performs behavioral analysis in accordance with the hardware profile in order to determine that the alteration of certain configuration parameters is sufficient to return the malware detection system back to an optimal performance level.

As described above, the system configuration optimization engine 150 determines, using the ML predictive model 375, whether the meta-information 130 identifies the malware detection system $120_1$ as running in an over-utilized performance level, an optimal performance level, or an under-utilized performance level. In response to determining that the malware detection system $120_1$ operates at an over-utilized performance level, the system health reporting logic 380 determines which configuration parameters may be altered in order to return the malware detection system 120 back to its optimal performance level. This may involve an increase (or reduction) in active processor cores, an increase (or reduction) in active virtual machine instances, an increase (or reduction) in memory usage, or the like.

Upon completion of the analysis of the meta-information 130 supported by the malware detection system $120_1$, the system health reporting logic 380 generates a system health message 450, which is provided to the malware detection system $120_1$ that supplied the meta-information 130. Herein, the system health message 450 may include (i) an identifier of the malware detection system supplying the analyzed meta-information; (ii) the performance level for the malware detection system; (iii) the performance level determinations for some or all of the plurality of configuration parameters; and/or (iv) one or more modified configuration parameter values that are used by the malware detection system to adjust its configuration to remain in or return to its optimal performance level. The system health message 450 is consistent with the configuration modification message 170 of FIG. 1, including one or more modified configuration parameter values 175.

As shown, the system health reporting logic 380 may provide the system health message 450 to a customer support service 460. The customer support service 460 may automatically analyze the contents of the system health message 450 and generate subsequent communications 465 (e.g., via electronic mail, text, automated audio, signaling to monitoring and reporting logic 470, etc.) to advise the customer as to proposed modifications to the cybersecurity system. Furthermore, the customer support service 460 may provide a portion of the system health message 450, such as modified configuration parameter values, to a targeted malware detection system. The modified configuration parameter values may be selected to perform system modifications directed to (i) hardware characteristic changes (e.g., number of active processor cores, network connector types or functionality such as activation of wireless transceivers supporting different wireless frequencies, memory capacity thresholds, etc.), (ii) operational setting changes (e.g., OS setting changes, number of active VMs, VM utilization, additional systems or services available for purchase to improve operability of the cybersecurity system, etc.), and/or (iii) software characteristic changes (e.g., number of active processes, applications utilized by the active processes, etc.) or the like. Additionally, or in the alternative, the system health reporting logic 380 may provide the system health message 450 to the monitoring and reporting service 470. The monitoring and reporting service 470 generates automatically, without user interaction, a report (e.g., information for generation of one or more display screens, a printed report, etc.). The report may be provided to a management console or an administrative interface of a targeted malware detection system. Similarly, the portion of the system health message 450, including modified configuration parameter values, may be provided to the targeted malware detection system (e.g., malware detection system $120_1$) via the administrative interface 230 of FIG. 2 or via a management console to which each cybersecurity system and/or malware detection system as access.

Figure 5:
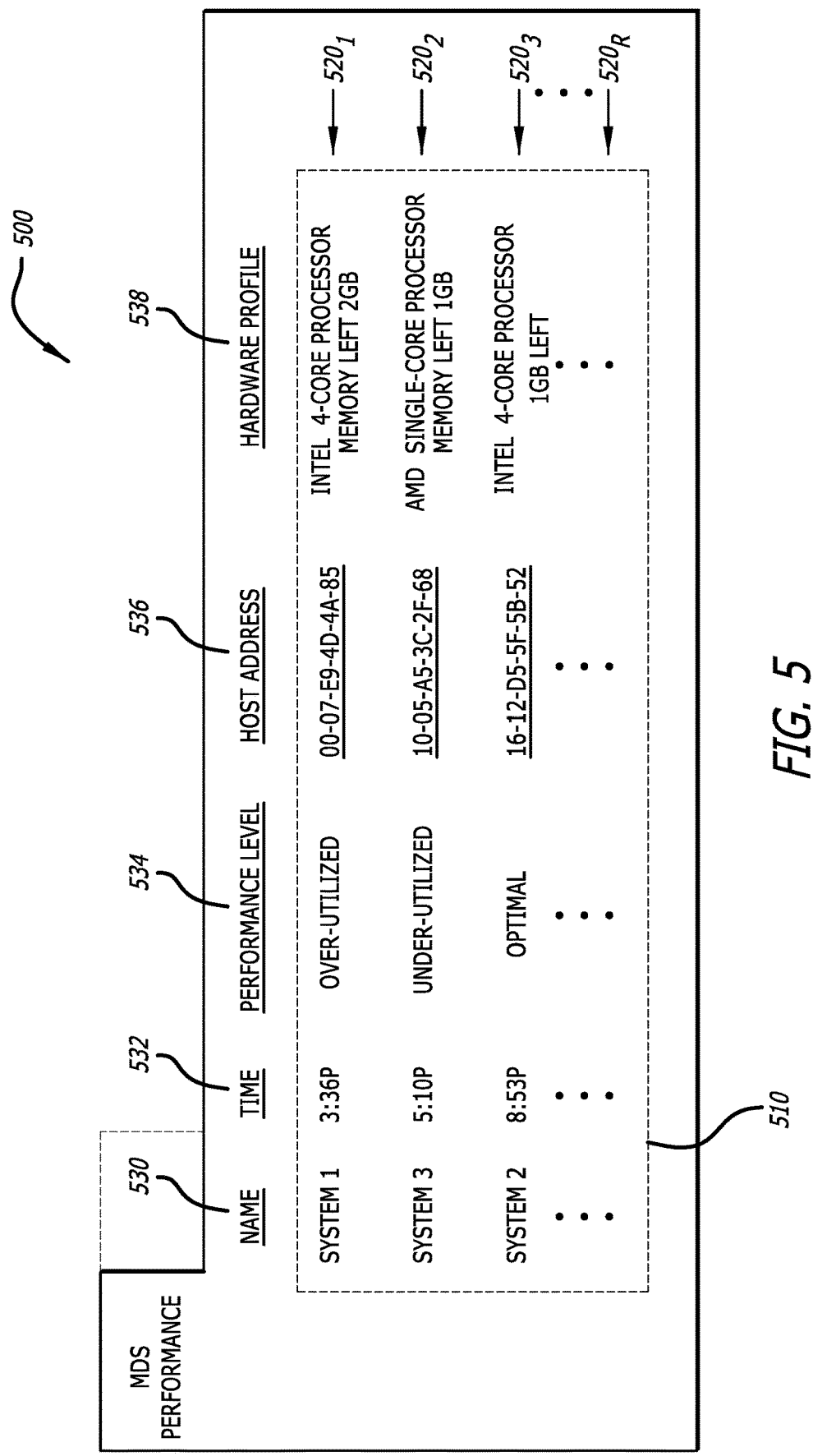
FIG. 5 is an exemplary embodiment of an interactive dashboard of a first interface display screen produced by the monitoring and reporting service of FIG. 4.

As shown in FIG. 5, based on the contents of the system health message 450, the monitoring and reporting service 470 generates a report that highlights information associated with performance levels for each of the malware detection systems for each particular customer. Particular types of performance levels (e.g., over-utilized performance levels and/or under-utilized performance levels) may be highlighted to visibly denote a deviation from the optimal performance level. Examples as to how the performance level may be highlighted includes (1) altering location or ordering of at least certain portions of the performance level information to prominently display such information within the report; (2) modifying the font (e.g., color, size, type style, and/or effects) used in conveying some of the malware detection systems operating at non-optimal performance levels; (3) placement of one or more images proximate to a listing of certain types of performance levels (e.g., optimal, non-optimal, etc.); and (4) placement in a special window or windows associated with listings of certain types of performance levels.

Referring still to FIG. 5, an exemplary embodiment of an interface display screen 500 produced by the monitoring and reporting service 470 of FIG. 4 that provides an interactive dashboard is shown. Herein, rendered by the monitoring and reporting service 470, the display screen 500 features a first display area 510 that illustrates information directed to the performance level determined for malware detection systems deployed on-premises at a customer site. Multiple highlighting techniques are shown in display screen 500, although it is contemplated that any one or more highlighting technique may be conducted for a particular display.

More specifically, according to one embodiment of the disclosure, the display area 510 displays a plurality of entries $520_1$-$520_R$ (R>1, R=3 for this embodiment) that provide information directed to performance levels of the malware detection systems $120_1$-$120_M$ for each customer. As shown, each row of entries (e.g., $520_1$) rendered by the display logic comprises a plurality of fields, including one or more of the following: (1) a first field 530 including an identifier of the malware detection system; (2) a second field 532 including a timestamp that identifies when an analysis of the performance level for the malware detection system was conducted by the system configuration optimization engine 150; and/or (3) a third field 534 including the predicted performance level determined for the malware detection system by the system configuration optimization engine 150. The display area 510 may include additional fields to provide more details directed to the malware detection systems associated with a particular customer, including a fourth field 536 that lists a host address for the corresponding malware detection system, and/or a fifth field 538 that lists a hardware profile for the corresponding malware detection system.

Herein, the fields 530, 532, and 534 associated with malware detection systems operating at non-optimal performance levels may warrant heightened scrutiny level, namely information is displayed more prominently than those fields associated with malware detection systems operating at optimal performance levels for example. This allows a network administrator to more quickly and easily determine malware detection systems that may need re-configuration to improve system operability.

As an example, as a highlighting technique illustrated for the first field 530, the font associated with the malware detection systems operating at non-optimal performance levels (SYSTEM 1; SYSTEM 3) may be displayed differently than the font associated with the host names for malware detection system operating at an optimal performance level (SYSTEM 2). Alternatively, or in addition to the font changes in display, the highlighting technique may be accomplished by ordering malware detection systems operating at non-optimal performance levels (SYSTEM 1; SYSTEM 3) at the top of a listing while any malware detection systems operating at optimal performance levels (SYSTEM 2) are ordered toward the bottom of the listing. As another alternative embodiment, although not shown, a single display screen may produce two areas, where a first area includes the malware detection systems operating at non-optimal performance levels (SYSTEM 1; SYSTEM 3) while a second area includes one or more malware detection systems operating at optimal performance levels (SYSTEM 2).

As further granularity of the operability of the malware detection system under analysis may be needed, according to one embodiment, selection of a field associated with a targeted malware detection system (e.g., performance level field 534 determined for the malware detection system by the system configuration optimization engine 150) allows the user to visualize the performance level of each individual configuration parameter, as shown in FIG. 6.

Referring to FIG. 6, it is contemplated that selection of a particular entry (e.g., third entry 534 including the performance level represented by an underlined portion) may enable the network administrator to obtain more detailed information of the configuration parameter values that resulted in determining whether a certain malware detection system is operating at an optimal performance level or a non-optimal performance level. For instance, as shown in FIG. 6, by selecting a particular entry (e.g., third entry 534), the administrator may be able to uncover the predictive results that lead to the predicted performance level.

According to one embodiment of the disclosure, the predictive results may include each statistic associated with a configuration parameter 610 supplied by the malware detection system $120_1$ as part of the meta-information 130, the value 620 associated with each current configuration parameter received from the malware detection system $120_1$, and the performance level 630 determined for that particular configuration parameter (i.e., "over-utilized," "optimal," and "under-utilized"). Also, as an optional feature, the weighting 640 allocated for each configuration parameter may be displayed with the performance level determination along with the normalized optimal range 650 based on heuristic data for the particular hardware profile.

Figure 7:
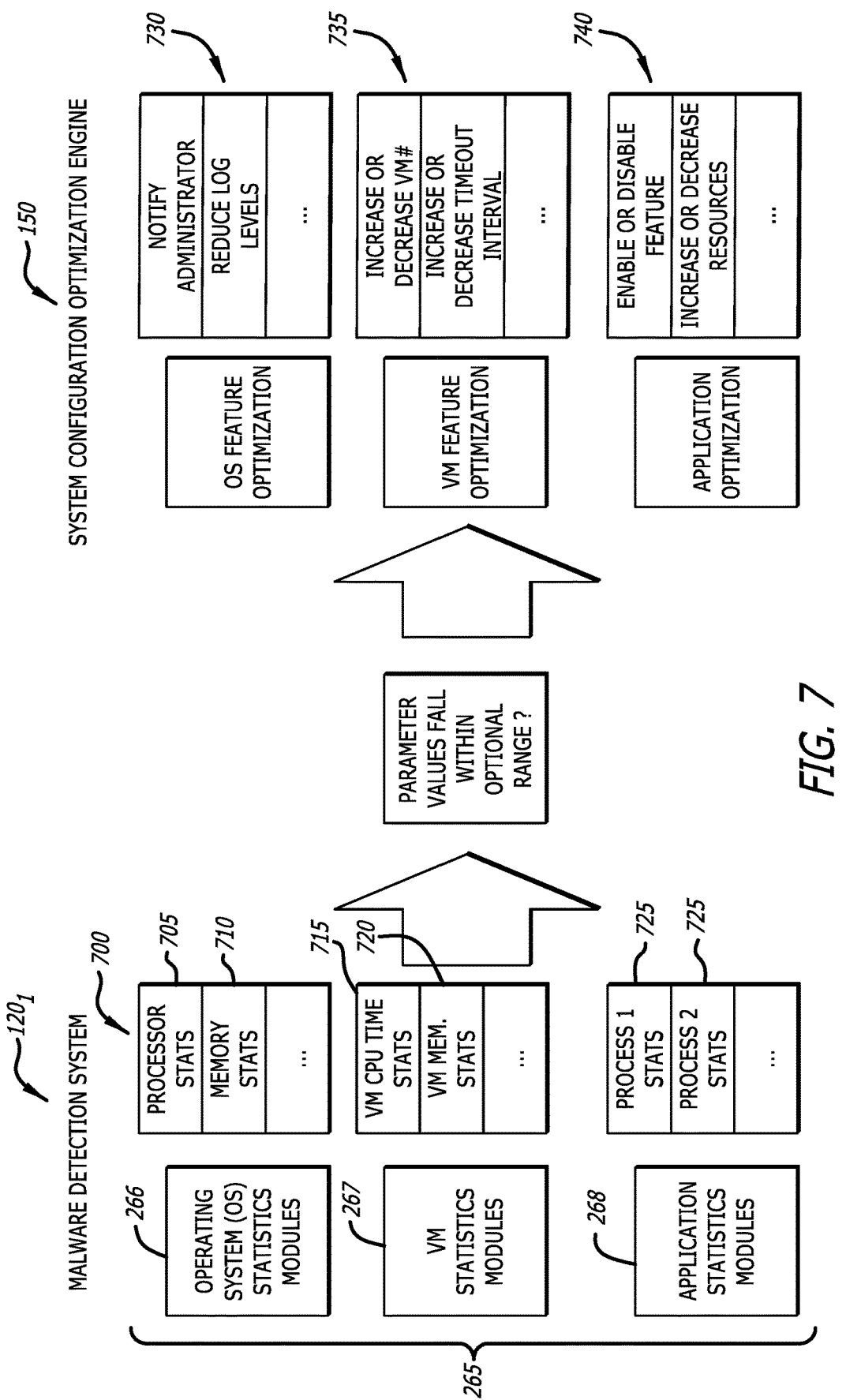
FIG. 7 is an exemplary embodiment of the logical operations performed during communications between a malware detection system deployed within a cybersecurity system and the system configuration optimization engine.

Referring to FIG. 7, an exemplary embodiment of the logical operations performed by the malware detection systems $120_1$ (deployed within the cybersecurity system $110_1$) and the system configuration optimization engine 150 is shown. Herein, on a periodic basis and/or an aperiodic basis, the configuration analysis logic 265 collects configuration data associated with the malware detection system $120_1$. According to this embodiment, the OS statistics module 266 is configured to collect hardware utilization statistics 700, which may include current operating state information associated with the processor(s) (processor statistics 705) and memory (memory statistics 710). Examples of the processor statistics 705 may include, but are not limited to processor utilization and/or the number of processor cores active.

Examples of the memory statistics 710 may include, but are not limited to available memory (size) and/or average (disk) access speed.

As shown in FIG. 7, the configuration analysis logic 265 further includes the VM statistics module 267 and the application statistics module 268. The VM statistics module 267 may be configured to collect VM utilization statistics such as the current virtual operating state associated with a virtual processor (VM processor statistics 715) and/or a virtual memory (virtual memory statistics 720). Examples of the VM processor statistics 715 may include, but are not limited to number of maximum VM instances available or running, or number of concurrent VMs running, or queue length of objects waiting for dynamic analysis, or guest CPU utilization of each VM. Examples of the virtual memory statistics 720 may include, but are not limited to virtual memory available (size). The application statistics module 268 may be configured to collect software statistics such as what processes are running 725 and event log outlining operations of the processes (not shown).

Thereafter, the configuration analysis logic 265 may temporarily store these statistics as the meta-information associated with the malware detection system $120_1$ and the meta-information 130 is made available to the system configuration optimization engine 150. For this embodiment, the meta-information 135 is transmitted to the system configuration optimization engine 150 and evaluated, using a predictive model developed based on heuristic data gathered from experiential knowledge of operational meta-information of known misconfigured and optimally configured systems. For instance, when processed by the ML modeling logic, the configuration parameters (and/or groups of configuration parameters) are compared to heuristic data associated with optimal and non-optimal performance levels associated with the respective configuration parameters (and/or groups of configuration parameters) to determine whether the configuration parameter value (and/or groups of configuration parameter values) falls within a prescribed range as determined by the heuristic data.

For those configuration parameter values falling outside of the optimal performance level, the system configuration optimization engine 150 determines (what configuration parameter values are modifiable for adjusting operability of the malware detection system $120_1$ to operate at the optimal performance level. The system configuration optimization engine 150 iteratively modifies certain configuration parameter values based on what configuration parameter values are negatively influencing performance by the malware detection system $120_1$ and analyzes the potential effects of a similar adjustment to the configuration of the malware detection system $120_1$.

As shown in FIG. 7, the system configuration optimization engine 150 determines which configuration parameter values may be altered in order to return the malware detection system $120_1$ back to its optimal performance level. More specifically, the system configuration optimization engine 150 may perform hardware optimization modifications 730 such as adjusting (i.e., increasing or reducing) the number of active processor cores or adjusting the number of log events maintained by the malware detection system $120_1$ (to increase or reduce processor utilization). Additionally, or in the alternative, the system configuration optimization engine 150 may perform VM optimization modifications 735 such as adjusting (i.e., increasing or reducing) the number of active virtual machine instances. Likewise, additionally or in the alternative, the system configuration optimization engine 150 may perform software optimization modifications 740 such as enabling or disabling certain software features or adjusting (i.e., increasing or reducing) resources available to a particular software process.

Figure 8:
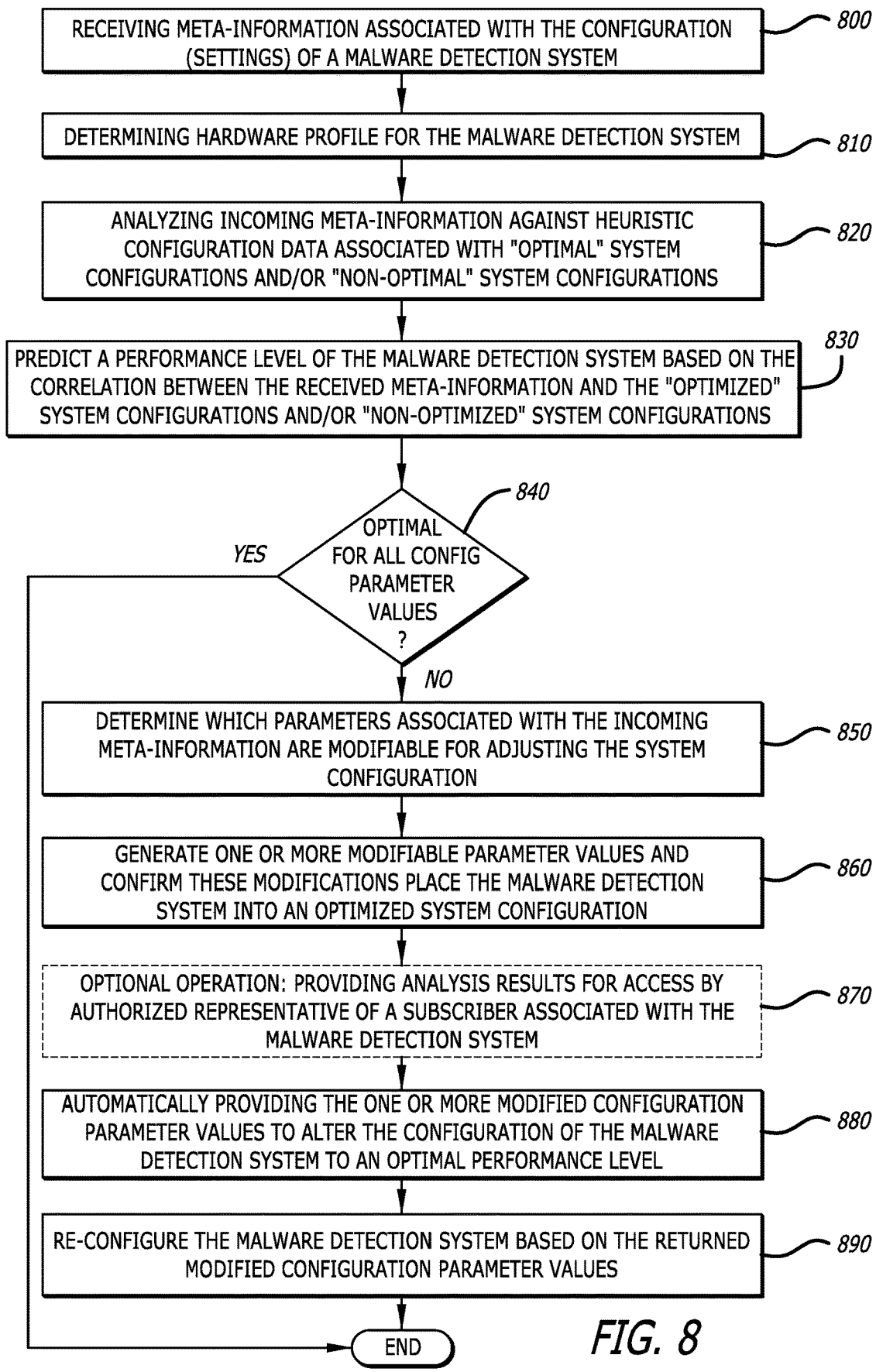
FIG. 8 is an exemplary embodiment of a flowchart illustrating operations by the system configuration optimization engine of FIG. 1.

Referring now to FIG. 8, an exemplary embodiment of a flowchart illustrating operations of the system configuration optimization engine of FIG. 1, FIG. 3 and FIG. 4 is shown. Initially, meta-information including configuration parameters directed to the operability of a malware detection system is received (block 800). From the meta-information, the hardware profile of the malware detection system is determined to identify a desired operating configuration when analyzing the configuration parameter values associated with the malware detection system (block 810). The incoming meta-information is analyzed against the heuristic configuration data in accordance with the hardware profile of the malware detection system in order to determine whether or not the incoming meta-information indicates that the malware detection system is operating at an optimal performance level (blocks 820, 830 and 840).

After the determination of the performance level of the malware detection system, the system configuration optimization engine determines which configuration parameter values associated with the incoming meta-information are modifiable to adjust the configuration (and operating state) of the malware detection system (block 850). Thereafter, the system configuration optimization engine may be configured to perform, within a virtualized environment representative of the hardware profile of the malware detection system, iterative adjustments of different configuration parameter values to determine whether such adjustments allow the current performance level to remain in or return to its optimal performance level (block 860). The performance levels of the malware detection system and configuration parameter values may be provided for display (block 870). The modified configuration parameter values may be automatically returned to the malware detection system for reconfiguring the malware detection system (blocks 880 and 890).

Figure 9:
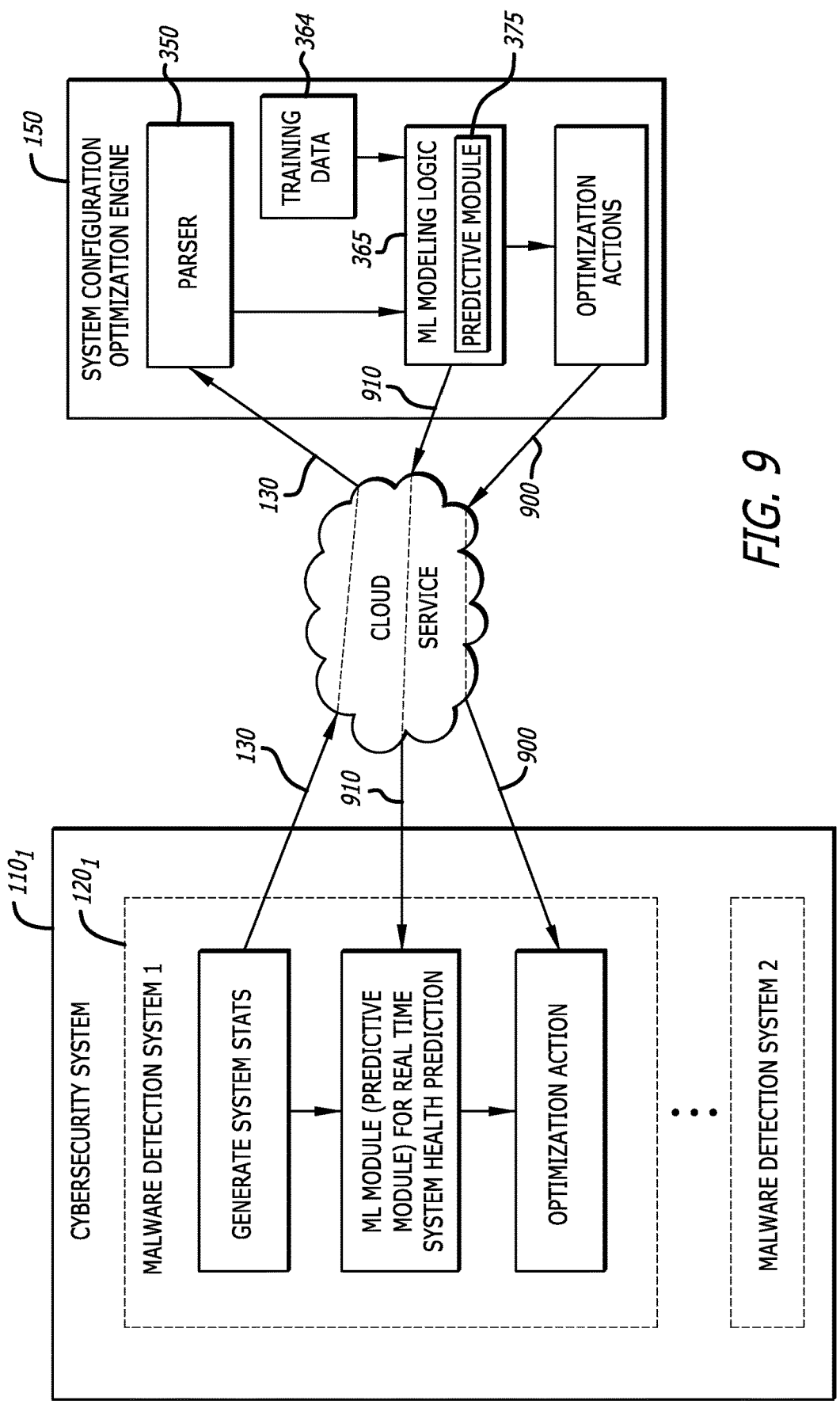
FIG. 9 is a second exemplary embodiment of an operation flow between a cybersecurity system and the system configuration optimization engine of FIG. 1.

Referring to FIG. 9, a second exemplary embodiment of an operation flow between the cybersecurity system $110_1$ and the system configuration optimization engine 150 is shown. Herein, as shown, the malware detection systems $120_1$ is in communication with the system configuration optimization engine 150 via a cloud service 900. The cloud service 900 is configured to aggregate incoming meta-information 130 from different malware detection systems $120_1$-$120_N$ of the cybersecurity system $110_1$ and control the return of modified configuration parameter values and the updating of the predictive model 375.

More specifically, the malware detection systems $120_1$, in response to a detected event or timeout, obtains meta-information associated with the current operating state of the malware detection system $120_1$. Herein, the meta-information 130 includes hardware utilization statistics, VM utilization statistics, and/or software utilization statistics as described above.

As shown, the system configuration optimization engine 150 includes the parser 350, to recover one or more the configuration parameter values contained in the meta-information 130. The statistics are used by the ML predictive model 375, being processed by the ML modeling logic 365, in determining a performance level at which the malware detection system $120_1$ is currently operating. Additionally, the ML predictive model 375, being processed by the ML modeling logic 365, determines the performance level for each of the configuration parameter values pertaining to the statistics. The ML predictive model 375 is repeatedly updated and configured as a result of the ML modeling logic 365 performing "training" operations on the training data 364.

Herein, the system configuration optimization engine 150 determines the hardware profile of a source of the configuration parameter value(s), where the hardware profile may influence what normalized, heuristic data is referenced in the classification of the source. For instance, using the ML predictive model 375, the ML modeling logic 365 analyzes portions of the meta-information 130 (e.g., statistics associated with configuration parameters) to classify the malware detection system $120_1$ (e.g., over-utilized performance level, optimal performance level, or under-utilized performance level). Furthermore, the system configuration optimization engine 150 determines what configuration parameter values are modifiable for adjusting operability of the malware detection system $120_1$ to operate at the optimal performance level. Thereafter, the system configuration optimization engine 150 iteratively modifies a subset of these configuration parameter values to determine what configuration modifications of the malware detection system $120_1$ will maintain the system at an optimal performance level.

More specifically, the system configuration optimization engine 150 determines, using the ML predictive model 375, whether the meta-information 130 identifies the malware detection system $120_1$ as running in a non-optimal performance level and the configuration modification necessary to return the malware detection system $120_1$. In response to determining that the malware detection system $120_1$ operates at an over-utilized performance level, the system configuration optimization engine 150 determines one or more configuration parameter values that, if altered, improve the performance level of the malware detection system $120_1$ and returns update information 900 that would cause the configuration modification at the malware detection system $120_1$ to occur in real-time. Updates 910 to the ML predictive model 375 are provided to the malware detection system $120_1$ to analyze the performance level of the malware detection system $120_1$ locally and in real-time.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for reconfiguring one or more malware detection systems each performing cybersecurity analyses on incoming data, the method comprising:
   receiving meta-information including metrics associated with the one or more malware detection systems;
   determining whether each of the one or more malware detection systems is operating at an optimal performance level by at least determining a correlation between the metrics and a baseline configuration being metrics gathered through experiential knowledge of meta-information associated with known malware detection systems, wherein the baseline configuration comprises utilization statistics including one or more of (i) hardware utilization statistics, (ii) virtual machine utilization statistics, or (iii) software utilization statistics; and
   generating results, based on the correlation between the metrics and the baseline configuration, provided as feedback to the one or more malware detection systems to update one or more configuration parameters of the one or more malware detection systems.

2. The computerized method of claim 1, wherein the metrics include statistics associated with the one or more configuration parameters.

3. The computerized method of claim 1, wherein the metrics include events monitored during operations of a malware detection system of the one or more malware detection systems.

4. The computerized method of claim 1, wherein each of the one or more malware detection systems being deployed as a cloud-based service and the optimal performance level associated with a malware detection system of the one or more malware detection systems corresponds to a preferred operating state for the malware detection system as measured by any one or more of the hardware utilization statistics, the virtual machine utilization statistics or the software utilization statistics associated with the malware detection system.

5. The computerized method of claim 1 further comprising:
   sending an alert message that requires an action by an administrator before one or more modified configuration parameters are provided to a malware detection system of the one or more malware detection systems to update the one or more configuration parameters of the malware detection system.

6. The computerized method of claim 1, wherein each of the one or more configuration parameters includes information that partially controls an operating state of a resource deployed within a malware detection system of the one or more malware detection systems.

7. The computerized method of claim 6, wherein a configuration parameter of the one or more configuration parameters is directed to virtual machine characteristics including a virtual machine utilization level.

8. The computerized method of claim 6, wherein the determining of the correlation between the metrics and the baseline configuration is conducted by a predictive model in operation within a system configuration optimization engine.

9. The computerized method of claim 8, wherein the correlation conducted by the predictive model comprises an evaluation of configuration parameter values being part of the metrics with configuration parameter values pertaining to past configurations that are associated with either (i) non-optimal performance levels, (ii) optimal performance levels, or (iii) a combination of non-optimal performance levels and optimal performance levels.

10. The computerized method of claim 8, wherein the determining whether each of the one or more malware detection systems is operating at the optimal performance level comprises determining, by the predictive model, whether a malware detection system of the one or more malware detection system is operating at the optimal performance level that represents a preferred operating state for the malware detection system performing cybersecurity analyses.

11. The computerized method of claim 8, wherein the predictive model is produced by at least training a machine learning model that includes applying different weighting factors to at least one of the one or more configuration parameters.

12. The computerized method of claim 1, wherein the utilization statistics are represented by at least one of (i) a threshold, (ii) a range, (iii) a number, or (iv) an operational bound.

13. The computerized method of claim 1, wherein the one or more configuration parameters include information to at least partially control an operating state of software operating within a malware detection system of the one or more malware detection systems.

14. The computerized method of claim 13, wherein the one or more configuration parameters includes a first configuration parameter directed to an operational setting of the malware detection system.

15. The computerized method of claim 14, wherein the operational setting includes one or more of (i) virtual machine characteristics including a number of active virtual machines used by the malware detection system or (ii) software characteristics including a number of active processes or a number of applications utilized by the active processes.

16. The computerized method of claim 13, wherein the baseline configuration associated with the malware detection system is selected based, at least in part, on a hardware profile for the malware detection system, along with other factors (e.g., threat landscape confronting the customer (for instance, as indicated by the industry protected by the malware detection system), subscription or customer type, etc.).

17. The computerized method of claim 13, wherein the baseline configuration associated with the malware detection system is selected based, at least in part, on a threat landscape confronting a customer associated with the one or more malware detection systems, the threat landscape reflects one or more factors including an industry protected by the malware detection system, a subscription type utilized by the customer, or a type of customer.

18. The computerized method of claim 1, wherein the one or more malware detection systems are deployed within a public cloud network.

19. The computerized method of claim 18, wherein a system configuration optimization engine is configured to conduct the receiving, determining and generating operations is deployed within the public cloud network.

20. The computerized method of claim 1, wherein the optimal performance level corresponds to or is associated with a preferred operating state of a malware detection system of the one or more malware detection system as measured by the hardware utilization statistics, the virtual machine utilization statistics, and/or the software utilization statistics.

21. The computerized method of claim 1, wherein the determining whether each of the one or more malware detection systems is operating at the optimal performance level comprises a determination as to a degree of correlation between the metrics associated with the received meta-information and metrics associated with the baseline configuration including metrics associated with one or more of (i) known misconfigured malware detection systems, (ii) known optimal malware detection systems, or (iii) any combination of known misconfigured malware detection systems and known optimal malware detection systems.

22. The computerized method of claim 1, wherein the determining whether each of the one or more malware detection systems is operating at the optimal performance level comprises determining a performance level for at least a malware detection system of the one or more malware detection systems by conducting operations on metrics provided by the malware detection system as part of the meta-information, the operations include assigning weighting to different metrics of the metrics provided by the malware detection system, the weighting to adjust the performance level toward one or more configuration parameters associated with the metrics that are more applicable to representing the performance level of the malware detection system when correlating with the baseline configuration.

23. The computerized method of claim 1, wherein the generating of the results to be provided as feedback to the one or more malware detection systems is conducted to reduce a number of false negatives.

24. The computerized method of claim 1, wherein the hardware utilization statistics includes at least one of processor utilization or an amount or degree of available memory for storage.

25. The computerized method of claim 1, wherein the virtual machine utilization statistics includes information directed to a degree of utilization of one or more virtual machines operating within a selected malware detection system or information directed to identifying a number of virtual machines activated and operational within a selected malware detection system.

26. The computerized method of claim 1, wherein the software utilization statistics include (i) information to determine what processes are running within a selected malware detection system or (ii) statistics associated with the processes or queue length.

27. The computerized method of claim 1, wherein the one or more malware detection systems are part of a cloud service.

28. The computerized method of claim 1 is performed in a cloud service.

29. The computerized method of claim 1, wherein the correlation between the metrics and the baseline configuration is conducted to determine whether a malware detection system of the one or more malware detection systems is operating at a non-optimal performance level, the non-optimal performance level indicating that the malware detection system is operating outside of a desired operating configuration.

30. The computerized method of claim 1, wherein the feedback includes one or more modified configuration parameter values that differ from values of the one or more configuration parameters received as part of the meta-information.

31. The computerized method of claim 30 further comprising:
updating the one or more configuration parameters of the one or more malware detection systems with the one or more modified configuration parameter values.

32. The computerized method of claim 31, wherein the updating of the one or more configuration parameters with the one or more modified configuration parameter values occurs in response to receipt of an approval from an administrator.

33. The computerized method of claim 1, wherein the one or more malware detection system includes a first malware detection system and the baseline configuration is based on a profile of the first malware detection system.

34. A system for detecting a cyber-attack comprising:
one or more processors;
a memory communicatively coupled to the one or more processors, the memory comprises
(i) a parser that, upon execution-by the one or more hardware processors, receives incoming data from a network device and recovers meta-information associated with one or more configuration parameters,
(ii) a machine learning-modeling logic that, upon execution by the one or more processors, conducts training on a machine learning model to produce a predictive model being applied to training data including data associated with the recovered meta-information to determine whether the network device is operating at a non-optimal performance level, and (iii) a system health reporting logic that, upon execution by the one or more processors and based on the recovered meta-information, (a) determines whether the network device is operating at the non-optimal performance level, (b) determines one or more configuration parameter values associated with the one or more configuration parameters that, if modifiable, readjusts operability of the network device from the non-optimal performance level to an optimal performance level, and (c) generates a message including information to alter the one or more configuration parameter values at the network device.

35. The system of claim 34, wherein the parser of the memory comprises a first sub-parser configured to parse structured data of the incoming data to recover the meta-information associated with the one or more configuration parameter values.

36. The system of claim 35, wherein the parser of the memory further comprises a second sub-parser configured to parse unstructured data of the incoming data to recover information subsequent to specific keywords being monitored.

37. The system of claim 35, wherein the recovered meta-information including statistics associated with the one or more configuration parameter values that represent a performance level of the network device.

38. The system of claim 37, wherein the parser that, upon execution by the one or more processors, receives incoming data from the network device being a malware detection system including circuitry to detect and analyze incoming objects propagating into or through a local network for malware.

39. The system of claim 35, wherein the system health reporting logic that, upon execution by the one or more processors, determines whether the network device is operating at the non-optimal performance level based on at least a prescribed degree of correlation between the statistics associated with a first configuration parameter of the one or more configuration parameters and the optimal performance level being a preferred operating state for the network device as measured by hardware utilization statistics.

40. The system of claim 35, wherein the system health reporting logic that, upon execution by the one or more processors, determines whether the network device is operating at the non-optimal performance level based on at least a prescribed degree of correlation between the statistics associated with a first configuration parameter of the one or more configuration parameters and the optimal performance level being a preferred operating state for the network device as measured by virtual machine utilization statistics.

41. The system of claim 35, wherein the system health reporting logic that, upon execution by the one or more processors, determines whether the network device is operating at the non-optimal performance level based on at least a prescribed degree of correlation between the statistics associated with a first configuration parameter of the one or more configuration parameters and the optimal performance level being a preferred operating state for the network device as measured by software utilization statistics.

42. The system of claim 34, wherein the system health reporting logic, upon execution by the one or more processors, performs iterative operations including modifying at least one configuration parameter value and analyzing predicted changes in performance level of the source in returning the network device to the optimal performance level.

43. The system of claim 8 further comprising an administrative interface operating as is a portal that allows an administrator, after credential exchange and authentication, to access and update logic stored within the memory, the portal allows for accessing and updating logic by at least modifying (i) one or more triggering events or timeout parameters associated with an event/timeout monitoring logic executed by the one or more processors, or (ii) code configured to detect a presence of malware within an object or its association with a cyberattack, or (iii) operational settings associated with the malware detection system, or (iv) software associated with the malware detection system.

44. The system of claim 34, wherein the machine learning modeling logic, upon execution by the one or more processors, conducts training on the machine learning model to produce the predictive model using labeled training data and unlabeled training data.

45. The system of claim 44, wherein the machine learning modeling logic, upon execution by the one or more processors, conducts the supervised training on the machine learning model using the labeled training data to initially train the machine learning model to improve detection accuracy of the machine learning model in determining whether the network device is operating at a non-optimal performance level until a prescribed accuracy is achieved.

46. A system for detecting a cyber-attack comprising:
one or more processors;
a memory communicatively coupled to the one or more processors, the memory comprises
(i) a parser that, upon execution by the one or more processors, receives incoming data from a network device and recovers meta-information associated with one or more configuration parameters and determines a hardware profile of the network device,
(ii) a machine learning modeling logic that, upon execution by the one or more processors, processes a machine learning predictive model that determines whether the network device is operating at a non-optimal performance level or an optimal performance level based on the recovered meta-information, and
(iii) a system health reporting logic that, upon execution by the one or more processors and utilizes the machine learning predictive model, (a) determines whether the network device is operating at the non-optimal performance level, (b) determines one or more configuration parameter values associated with the one or more configuration parameters that, if modifiable, readjusts operability of the network device from the non-optimal performance level to an optimal performance level, and (c) generates a message including information to alter the one or more configuration parameter values at the network device.

47. The system of claim 46, wherein the system health reporting logic that, upon execution by the one or more processors, further generates an update of the machine learning predictive model to enable the network device to analyze performance level locally and in real time.

48. The system of claim 46, wherein the machine learning modeling logic being configured to conduct training on a machine learning model using training data to produce the machine learning predictive model, the training data includes information associated the meta-information.

49. The system of claim 48, wherein the information associated with the meta-information includes normalized, heuristic data pertaining to the configuration parameter values.

50. The system of claim 48, wherein the machine learning modeling logic is configured to evaluate operability of the machine learning model by applying different weighting factors for different configuration parameter values of the configuration parameter values received from the parser.

51. The system of claim 46, wherein the machine learning modeling logic is configured to evaluate operability of the machine learning model based on the training data including at least configuration parameter values associated a machine learning model operating on the system health reporting logic.

* * * * *